(12) United States Patent
Forster

(10) Patent No.: US 7,623,834 B2
(45) Date of Patent: Nov. 24, 2009

(54) MULTI-BAND WIRELESS COMMUNICATION DEVICE AND METHOD

(76) Inventor: Ian J Forster, 31 Great Cob, Springfield, Chelmsford, Essex (GB) CM1 6LA ( * ) Notice: Subject to any disclaimer, the term of this patent is extended or adjusted under 35 U.S.C. 154(b) by 0 days.

(21) Appl. No.: 11/302,416

(22) Filed: Dec. 12, 2005

(65) Prior Publication Data
US 2006/0160513 A1 Jul. 20, 2006

Related U.S. Application Data

(63) Continuation of application No. 09/678,630, filed on Oct. 3, 2000, now Pat. No. 6,975,834.

(51) Int. Cl.
*H04B 1/06* (2006.01)
*H04B 7/00* (2006.01)
*H04Q 5/22* (2006.01)

(52) U.S. Cl. .................... 455/272; 455/226.1; 340/10.1
(58) Field of Classification Search ................. 455/272, 455/275, 226.1, 67.11, 67.14, 333, 101, 274, 455/277.1, 279.1; 340/10.1, 10.3, 10.42
See application file for complete search history.

(56) References Cited

U.S. PATENT DOCUMENTS

| | | | |
|---|---|---|---|
| 4,063,229 A | 12/1977 | Welsh |
| 4,433,336 A | 2/1984 | Carr |
| 4,727,598 A | 2/1988 | Ehlers |
| 4,752,680 A | 6/1988 | Larsson |
| 4,857,893 A | 8/1989 | Carroll |
| 5,566,441 A | 10/1996 | Marsh |
| 5,585,953 A | 12/1996 | Zavrel |
| 5,592,182 A | 1/1997 | Yao |
| 5,719,586 A | 2/1998 | Tuttle |
| 5,764,196 A | 6/1998 | Fujimoto |
| 5,779,839 A | 7/1998 | Tuttle |
| 5,929,760 A | 7/1999 | Monahan |
| 5,952,977 A | 9/1999 | Taniguchi |
| 5,972,152 A | 10/1999 | Lake |
| 5,973,600 A | 10/1999 | Mosher |
| 5,995,048 A | 11/1999 | Smithgall |
| 6,025,802 A | 2/2000 | Eggleston |
| 6,027,027 A | 2/2000 | Smithgall |
| 6,043,746 A | 3/2000 | Sorrells |
| 6,045,652 A | 4/2000 | Tuttle |
| 6,057,803 A | 5/2000 | Kane |
| 6,075,973 A | 6/2000 | Greeff |
| 6,078,259 A | 6/2000 | Brady |
| 6,078,791 A | 6/2000 | Tuttle |
| 6,089,458 A | 7/2000 | Lake |
| 6,094,173 A | 7/2000 | Nylander |
| 6,100,804 A | 8/2000 | Brady |

(Continued)

FOREIGN PATENT DOCUMENTS

JP 06175264 A 7/1994

(Continued)

*Primary Examiner*—Eugene Yun
(74) *Attorney, Agent, or Firm*—Christensen O'Connor Johnson Kindness PLLC

(57) ABSTRACT

The present invention relates to a wireless communication device, such as a transponder, that has a plurality of antennas for multi-frequency usage. The wireless communication device comprises a control system, communication electronics, memory, and the aforementioned antennas. A wireless communication device having a pole antenna may be used with one or more loop conductor antennas to achieve the desired operating frequencies. A wireless communication device having a dipole antenna may be coupled across a loop conductor antenna to provide different loop conductor configurations depending on the frequency.

27 Claims, 14 Drawing Sheets

U.S. PATENT DOCUMENTS

| | | |
|---|---|---|
| 6,154,137 A | 11/2000 | Goff |
| 6,211,846 B1 | 4/2001 | Gouin |
| 6,346,922 B1 | 2/2002 | Proctor |
| 6,639,541 B1 * | 10/2003 | Quintana et al. ............... 342/18 |
| 6,868,073 B1 * | 3/2005 | Carrender ................... 370/278 |
| 6,946,950 B1 * | 9/2005 | Ueno et al. ................ 340/10.1 |

FOREIGN PATENT DOCUMENTS

| | | |
|---|---|---|
| JP | 08044831 A | 2/1996 |
| JP | 10249250 A | 9/1998 |
| JP | 2000-077928 A | 3/2000 |
| WO | WO9908402 A1 | 2/1999 |
| WO | WO9944258 A1 | 9/1999 |
| WO | WO9967737 A1 | 12/1999 |
| WO | WO0229929 A2 | 4/2002 |

* cited by examiner

MULTI-BAND WIRELESS COMMUNICATION DEVICE AND METHOD

FIELD OF THE INVENTION

The present invention relates to a wireless communication device and communication of information concerning an item containing the wireless communication device, and particularly to a wireless communication device supporting multi-frequency usage.

BACKGROUND OF THE INVENTION

It is often desired to track and identify items, such as packages, containers, and the like, and to communicate information concerning such items wirelessly. One method of tracking and providing information concerning packages is to attach a wireless communication device, such as a radio frequency identification (RFID) transponder or other identification device, to packages or items. The information communicated concerning the packages or items may include expiration dates, "born on" dates, lot numbers, manufacturing information, and the like. A wireless communication device may be attached to an individual package, to a container containing multiple packages, or other item as the situation merits.

Different countries have allocated different portions of the electromagnetic spectrum for use with such wireless communication devices. For example, some countries may use frequency bands centered on 2.45 GHz and others may use bands centered on 13.56 MHz, 868 MHz, or 915 MHz. It is desirable to be able to communicate at a plurality of these frequencies to increase the functionality and utility of the wireless communication device. For each of these frequencies, the wireless communication device may need a different antenna. Multiple antennas inherently take up space in the wireless communication device that is considered valuable in this era of miniaturization. This situation is compounded when the needed electrical length for antennas operating at these different frequencies is taken into account.

SUMMARY OF THE INVENTION

The present invention relates to a wireless communication device, such as a transponder, that has a plurality of antennas for operation at multiple frequencies. The wireless communication device comprises a control system, communication electronics, memory, and the aforementioned antennas.

In a first embodiment, a dipole antenna is positioned across one or more nested loop conductor antennas to achieve multiple operating frequencies. Two conductive tabs are coupled to the wireless communication device to provide the dipole antenna. This dipole antenna provides a first operating frequency to the wireless communication device. The conductive tabs are also coupled across the nested loop conductor antenna through capacitive coupling. A second wireless communication circuit is also coupled to the nested loop conductor antenna. As the frequency increases, the conductive tabs across the nested loop conductor antenna become closer to a short. Therefore, different loop conductor antenna configurations in the nested loop conductor antenna resonate depending upon the frequency to provide multiple operating frequencies to the wireless communication device.

In a second embodiment, a pole antenna is coupled to the wireless communication device that serves as one antenna for a first operating frequency. At least one additional loop conductor antenna is placed in proximity to the pole antenna to provide at least one additional operating frequency.

By way of example, the pole antenna may be a dipole antenna that is comprised of two conductive tabs coupled to the wireless communication device. Two loop conductor antennas are placed in close proximity to the tabs for capacitive coupling. Each of the loop conductor antennas resonate at their own design frequency. Since the tabs that serve as a dipole antenna are also coupled to the loop conductor antennas, the wireless communication device is capable of operating at three frequencies. The first operating frequency is achieved through the dipole antenna. The second operating frequency is achieved through capacitive coupling between the wireless communication device and one of the loop conductor antennas. The third frequency is achieved through capacitive coupling between the wireless communication device and the other loop conductor antenna.

The above embodiment is also applicable to a monopole antenna arrangement whereby one conductive tab is coupled to the wireless communication device. A ground plane is additionally provided and coupled to the wireless communication device.

Variations on the second embodiment comprise using an asymmetrical dipole antenna that is coupled to loops of differing shapes and sizes. Likewise, manipulating the ground plane may also provide desired variations. In a first variation, an asymmetrical dipole antenna is coupled to differently sized loop antennas and a ground plane positioned underneath the dipole antenna. In another variation, the ground plane is slotted to minimize interaction between the loop antennas. In another variation, one of the loops includes a nested loop. In still another variation, the loop comprises a low frequency loop antenna.

DETAILED DESCRIPTION OF THE INVENTION

Figure 1:
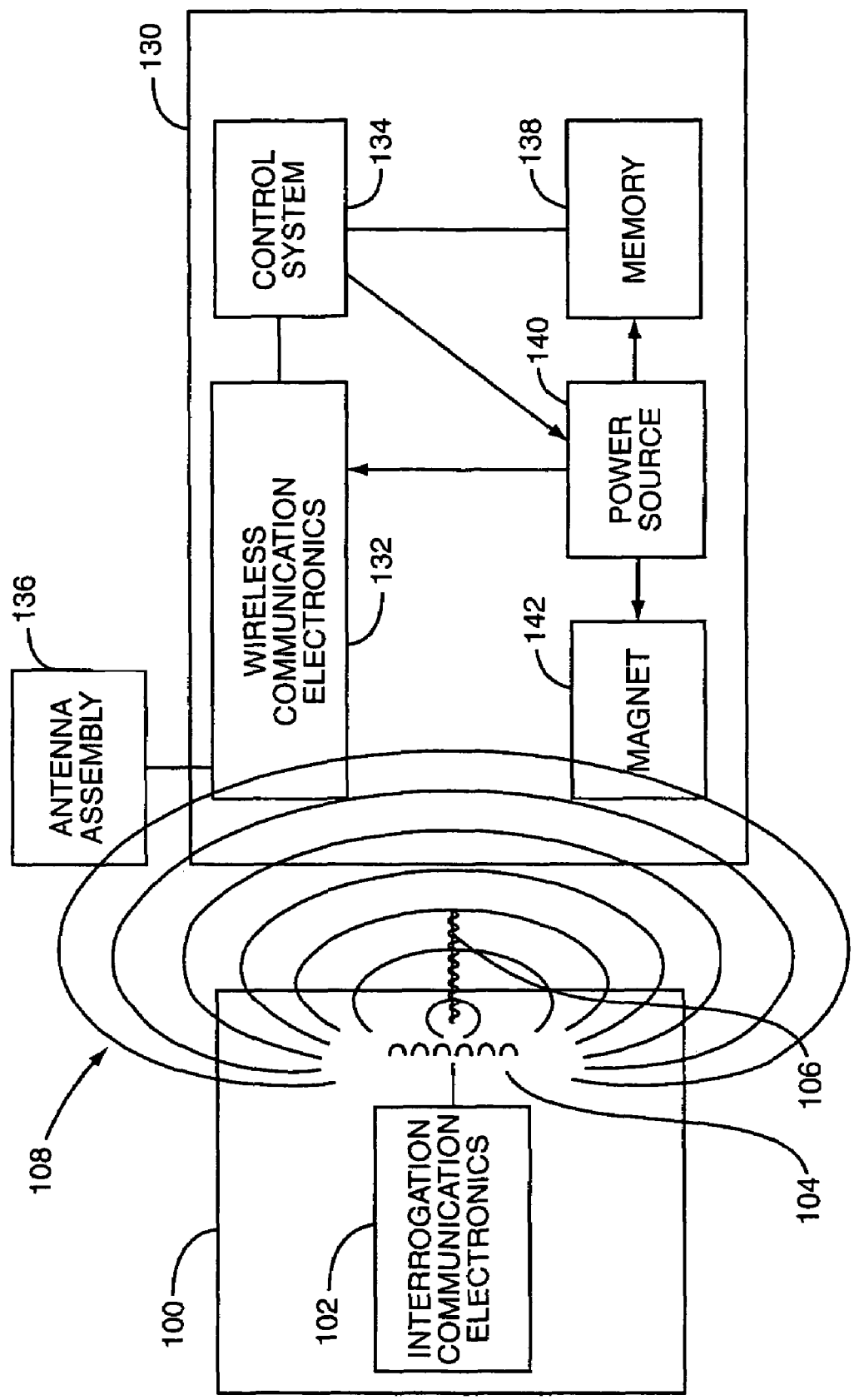
FIG. 1 illustrates a schematic diagram of a wireless communication device and an interrogation reader.

The present invention is directed to providing multi-frequency functionality for a wireless communication device, such as a transponder. Referring now to the drawings in general, and to FIG. 1 in particular, it will be understood that the illustrations are for the purpose of describing specific embodiments of the present invention and are not intended to limit the invention thereto. A wireless communication device 130 is connected or attached to a device or article of manufacture or other material to communicate information electronically and wirelessly concerning the device, article of manufacture, or other material.

One embodiment of the present invention uses a specific type of wireless communication device 130 called a radio frequency transponder. Herein, "transponder" is used interchangeably with "wireless communication device" 130; however, the present invention is not limited to using a transponder as the wireless communication device 130. Some wireless communications devices 130, such as that described in U.S. Pat. No. 5,585,953, entitled "IR/RF radio transceiver and method," incorporated herein by reference in its entirety, have both transmit and receive capability and can be used in the present invention. Other wireless communication devices 130 have receive capability and use the energy received to communicate back, such as described in U.S. Pat. No. 6,078,259 entitled "Radio frequency identification tag," incorporated herein by reference in its entirety. Such passive devices may likewise be used with the present invention. The wireless communication device 130 in the present invention can be any type of device that allows reception of wireless, electronic communications and is able to communicate in response thereto.

The transponder 130 may be made out of plastic or other suitable material and comprises a control system 134, wireless communication electronics 132, antenna assembly 136, and memory 138.

The wireless communication electronics 132 receive information wirelessly through at least one of the antennas in antenna assembly 136. The wireless communication electronics 132 assimilate the received information and communicate it to the control system 134. The control system 134 receives this information and controls the operation of the transponder 130. In one embodiment, the control system 134 is an integrated circuit or other type of microprocessor or micro-controller electronics that controls the operations of the transponder 130. The control system 134 is connected to the wireless communication electronics 132 to communicate and receive transmissions.

The transponder 130 may also contain a magnet 142 to aid in the transponder's 130 attachment to the magnetic surface portion of an article if so desired. The magnetic surface portion may be a conductive material or may be a non-conductive material. The transponder 130 may also contain its own power source 140, such as a battery or reservoir capacitor, for needed power to carry out operations within the transponder 130 that are discussed later. U.S. Pat. No. 4,857,893, entitled "Single chip transponder device," incorporated hereby by reference in its entirety, discusses a transponder having its own battery as a power source for a variety of functions. In this '893 patent, the battery allows the transponder to be converted into a self-powered beacon device that periodically transmits its identifying encoded data word without the need for the presence of a carrier signal.

FIG. 1 also depicts how communication is achieved with the transponder 130. An interrogation reader 100 contains interrogation communication electronics 102 and an interrogation antenna 104. Interrogation readers 100 are also referred to herein as interrogators. As used herein, the term "interrogator" refers to a wireless communications device capable of establishing communications with a plurality of corresponding wireless communication devices, herein referred to as "transponders," for the purpose of discriminating among and identifying individual transponders, e.g., by receiving and decoding an identification code. The interrogation reader 100 communicates to the transponder 130 by emitting a signal or command modulated in a signal 106 through the interrogation antenna 104. The interrogation antenna 104 may be any type of antenna that can radiate the modulated signal 106 through a field 108 so that a compatible device such as a transponder 130 can receive such signal 106 through antenna assembly 136. The field 108 could be any of a variety of different types used in the communication industry including electric, magnetic, or electro-magnetic. The signal 106 is a message containing information and/or specific instructions for the transponder 130. The range of interrogation reader 100 is designed and configured so as to encompass the area in the immediate vicinity of interrogation reader 100.

When the transponder antenna assembly 136 is in the presence of the field 108 emitted by the interrogation antenna 104, the wireless communication electronics 132 are energized, thereby energizing the transponder 130. The transponder 130 remains energized so long as its antenna 136 is in the field 108 of the interrogation reader 100. The wireless communication electronics 132 demodulate the signal 106 and send a message containing information and/or specific instructions to the control system 134 for appropriate actions. For example, the request in the message may be for the transponder 130 to send back information stored in memory 138 about the article to which the transponder 130 is attached, including, but not necessarily limited to: its date of manufacture, place of manufacture, "born-on" date, expiration date, tracking information, status information, type of article, temperature of the article or its surroundings (if a temperature sensor is provided) or other distinguishing characteristics of the article. The transponder 130 communicates information to the interrogation reader 100 by altering the contents of the signal 106 in its return path to the interrogation reader 100.

Alternative forms exist for communicating with a wireless communication device 130. For instance, the wireless communication device 130 may have a transmitter so that it can send information to a remote source without having to use the signal 106 return as a means for communication. The wireless communication device 130 may contain its own power source 140 if it transmits information separately from its reception. It is understood to one of ordinary skill in the art that there are many other manners to provide a wireless communication device 130 to communicate wirelessly for use with the present invention, such as a transponder 130, and that the present invention includes but is not limited to the particular manners described above.

Figure 2:
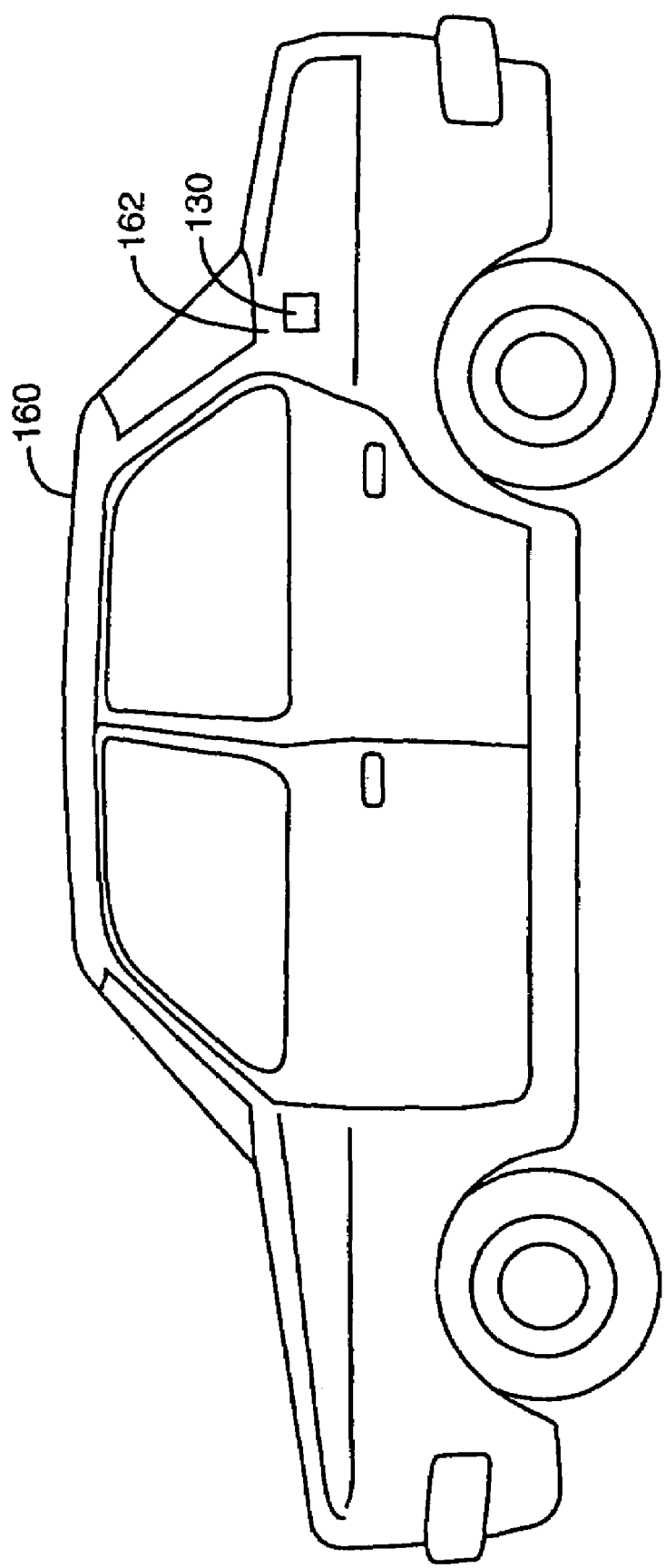
FIG. 2 illustrates a wireless communication device attached to an automobile.

FIG. 2 illustrates a particular embodiment of the transponder 130 attached to a particular article or article of manufacture, namely, an automobile 160. The transponder 130 is mounted to a magnetic surface portion 162 of the automobile 160 using magnetic force for attraction. Magnet 142 associated with the transponder 130 may be used to provide an attractive force, causing the wireless communication device 130 to attract to and attach to the magnetic surface portion 162 of the automobile 160. Magnet 142 may be a permanent magnet or electro-magnet. Magnet 142 may be provided by constructing the transponder 130 and/or its elements, such as antenna assembly 136, out of magnetic material. Such embodiments are disclosed in commonly owned, co-pending U.S. patent application entitled "Wireless communication device attachment and detachment device and method," Ser. No. 09/618,506, filed 18 Jul. 2000, and incorporated herein by reference in its entirety. The transponder 130 may also be attached to an article using a fastener or an adhesive material between the transponder 130 and the article.

Through any appropriate attachment techniques, such as those described above, the transponder 130 may be attached to articles for tracking or information purposes. For instance, the location of the automobile 160 may be tracked through use of the transponder 130 if the transponder 130 contains an identification means, such as a number, relating to the particular automobile 160 to which the transponder 130 is attached. Additional information concerning the automobile 160, including its make, model, etc., can be communicated and/or tracked wirelessly. Other devices or items may be tracked instead of an automobile 160. For example, packages or containers may be tracked as described in commonly owned U.S. patent application Ser. No. 09/618,505, entitled WIRELESS COMMUNICATION DEVICE AND METHOD, filed 18 Jul. 2000, which is hereby incorporated by reference in its entirety. Examples include chip bags, chewing gum packages, beer kegs, and the like.

Figure 3:
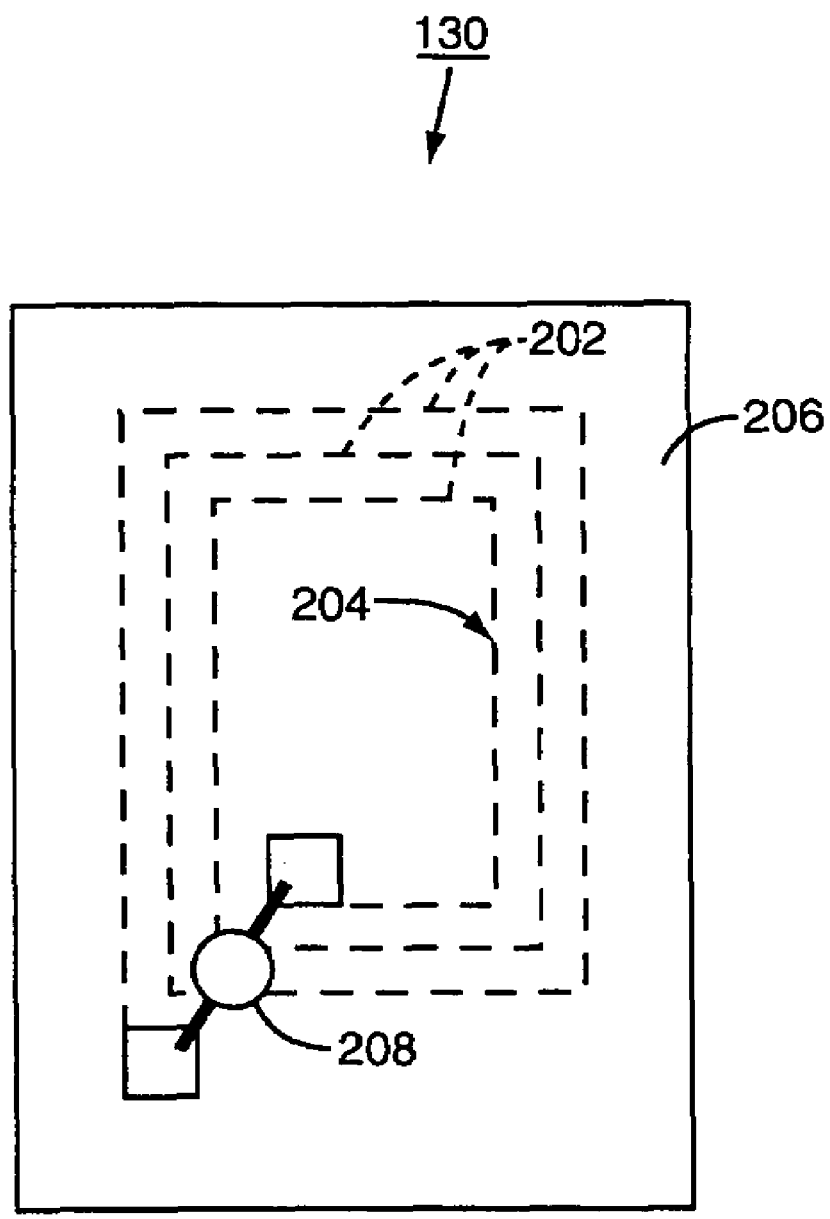
FIG. 3 illustrates a prior art antenna arrangement for a wireless communication device.

A presently existing wireless communication device is illustrated in FIG. 3. In particular, the wireless communication device 200 conforms to an international standard, ISO-15693-2. Wireless communication device 200 operates at 13.56 MHz by using magnetic field coupling, involving the use of tuned coils 202 as a loop conductor antenna 204 on a first side of a substrate 206. Typically, an integrated chip 208 is mounted on the opposite side of the substrate 206. Electrical connections extend from the integrated chip 208, through the substrate 206 to provide an electrical connection between the wireless communication electronics 132 (FIG. 1) and the antenna 204.

Note that while this is an example of a prior art device, other prior art devices also exist which operate at another standard for 125 kHz. The present invention is also adapted for use with such devices.

Figure 4:
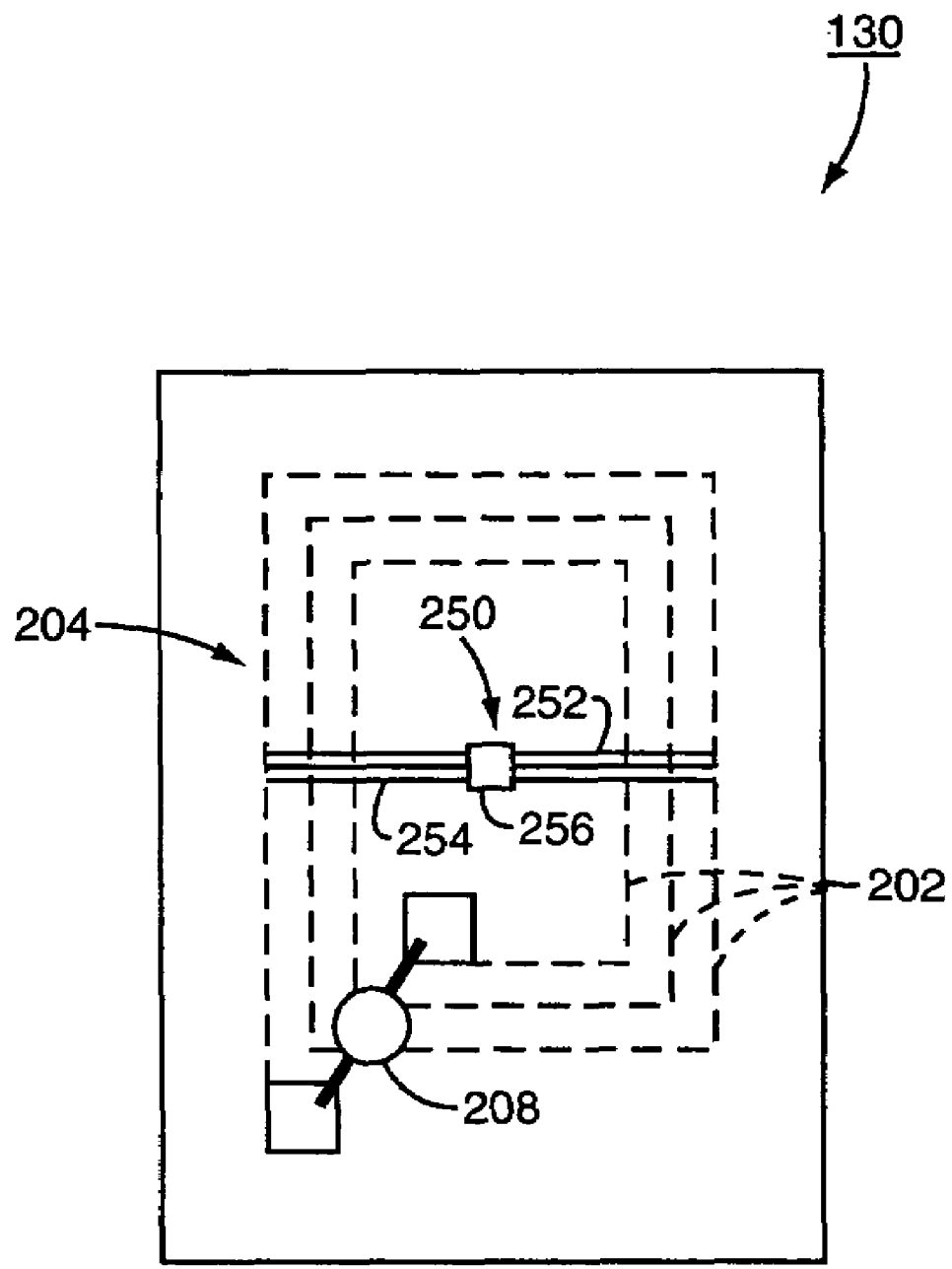
FIG. 4 illustrates a first embodiment of an antenna arrangement for a wireless communication device.

As alluded to above, different interrogation readers 100 may interrogate a wireless communication device 130 at different frequencies. To that end, it may be necessary to add antennas to the wireless communication device 130. One embodiment is illustrated in FIG. 4. Wireless communication device 130 is substantially similar to wireless communication device 200. However, in addition to the loop antenna 204, a dipole antenna 250 is placed across the coils 202. Dipole antenna 250 comprises a first tab 252, a second tab 254, each of which may be approximately a quarter wavelength long relative to a desired operating frequency, and an integrated circuit 256. The tabs 252, 254 are constructed out any type of material desired so long as the material is conductive. Such material be a ferrous material, including metal, steel, iron, or the material may be aluminum or other type of conducting material. In another embodiment, a conductor made from metal loaded ink may be used as described in U.S. Pat. No. 5,566,441, entitled "Attaching an electronic circuit to a substrate," incorporated herein by reference in its entirety. In particular, a multi-layer screen or other printing method may be used to create the entire tag while the chips, 208, 256 are inserted in the ink whilst still wet. As used herein, the terms chips and circuits are used interchangeably.

In one implementation, the dipole antenna 250 is operative at 2.45 GHz. The integrated chip 256 may contain the wireless communication electronics 132, control system 134 and other desired components. An example of an appropriate integrated circuit comprises those used by INTERMEC in the Intellitag® labels and those used by SCS in the DL100 label. Note that the loops 202 act to load capacitively the tips of the dipole antenna 250. While not shown explicitly, a dielectric material may be placed between the tabs 252, 254 and the coils 202 to preclude the creation of an outright short thereacross. An effective short at higher frequencies (i.e., above the operative frequency of the loop antenna 204) is permissible.

Figure 5A:
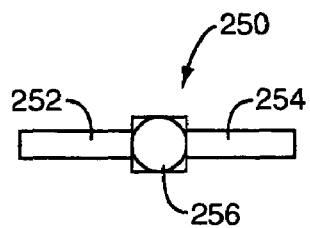
FIGS. 5A-5F illustrate a number of different effective antennas in the embodiment of FIG. 4.
Figure 5B:
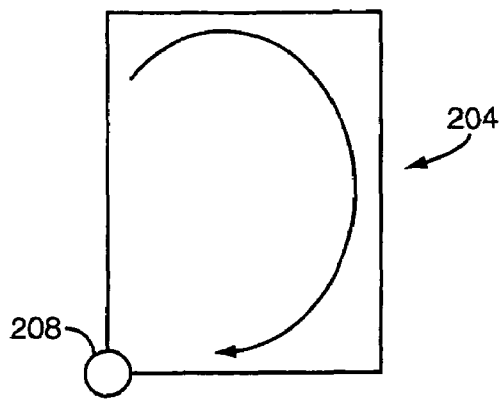
Figure 5C:
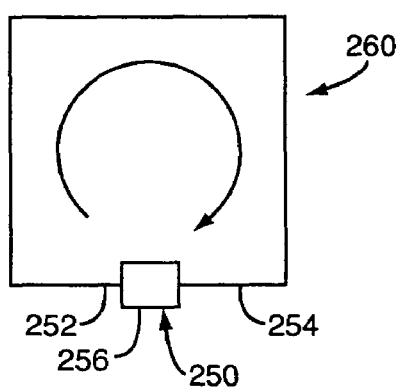

This arrangement creates a plurality of effective antennas that may be used with an interrogation reader 100. FIGS. 5A-5F illustrate a number of different effective antennas that are present within the wireless communication device 130 of FIG. 4. The arrows within the loops of FIGS. 5A-5F illustrate the effective loop. FIG. 5A illustrates the effective antenna formed by the dipole antenna 250. Even coupled to the wireless communication device 130, the dipole antenna 250 still operates at its desired frequency, which, in an exemplary embodiment, is 2.45 GHz. FIG. 5B illustrates the loop conductor antenna 204, which, likewise operates at its desired frequency, which, in an exemplary embodiment is 13.56 MHz. FIG. 5C illustrates a first created loop conductor antenna 260 that enables reception in a third band. In particular, the capacitance between the tip of the tabs 252, 254 and the coils 202 effectively shorts the coils 202 together at higher frequencies, treating them as a single conductor. This coupling links the integrated chip 256 to two additional loops formed by the intersection of loop 204 with the dipole antenna 250. A first created loop antenna 260 is formed by the top half of the loop 204, the tabs 252, 254 of the dipole antenna 250, and the integrated chip 256. In an exemplary embodiment, this may operate at 915 MHz.

Figure 5D:
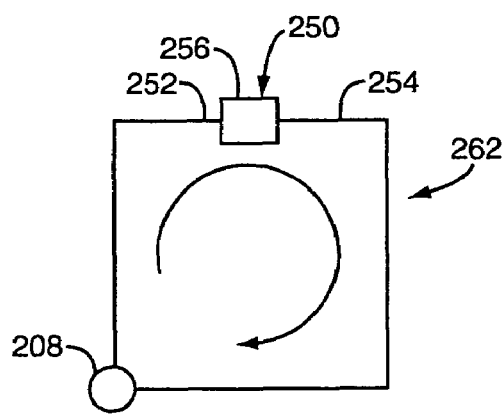
Figure 5E:
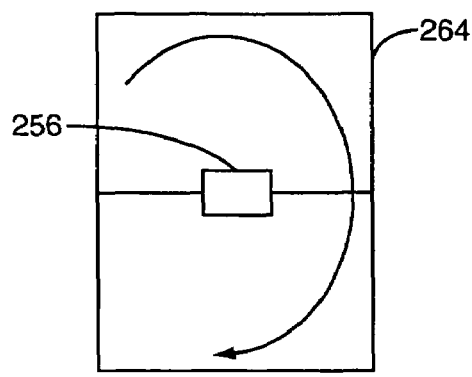
Figure 5F:
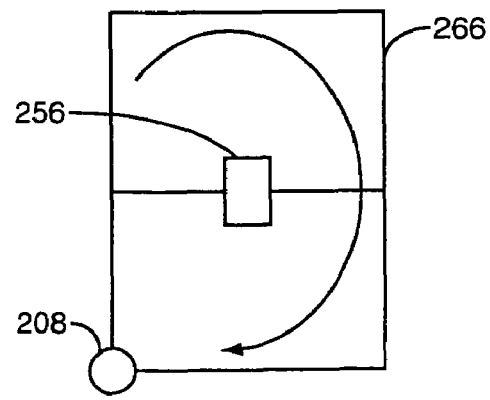

As illustrated in FIG. 5D, a second created loop antenna 262 is formed by the lower half of the loop 204, the tabs 252, 254 of the dipole antenna 250, and the integrated chips 208, 256. If the UHF capacitance of the integrated chip 208 is correctly selected, it is possible to tune the second loop 262 to a different UHF frequency from the first loop 260, such as the desirable 868 MHz.

It should be appreciated that both the first and second loops 260, 262 can be made to act as UHF antennas by ensuring that the net inductance of these loops at the UHF frequency, the impedance of the chip 256 (and chip 208 in loop 260), and the series capacitances formed by the parallel plate coupling of the tab 252, 254 tips to the coils 202 collectively resonate at the desired frequencies. This can be controlled by varying the size of the tabs 252, 254 and the position of the dipole antenna 250 on the wireless communication device 130. In one embodiment, the transponder 130 operates at a 0.5 meter range at 13.56 MHz, 3 meters at 915 MHz, and 0.5 meters at 2.45 GHz.

The tabs 252, 254 capacitively couple to the coils 202, and create an effective short thereacross at UHF frequencies. It may also be possible that the tabs 252, 254 may be used as feed lines that capactively couple to the coils 202 and drive the same at still other frequencies. Since the coils are effectively shorted at some frequencies, but not at others, a loop 264 (FIG. 5E) may be generated and used as a loop conductor antenna. Likewise, at other frequencies, the integrated chip 208 may still be part of the electrical length of a loop 266 (FIG. 5F), allowing yet another operative frequency.

It may also be possible to vary how the coils are capacitively shorted together by the tabs 252, 254, by varying the size and shape of the tabs 252, 254. For example, flaring or tapering the tabs 252, 254 may make it more likely that only a portion of the coils are shorted together at certain frequencies. This allows still other frequencies to be used as needed or desired.

Note that, for the purposes of the present invention, this wireless communication device 130 has two or more loop conductor antennas, they just happen to share at least portions of the same conductor coil.

Figure 13:
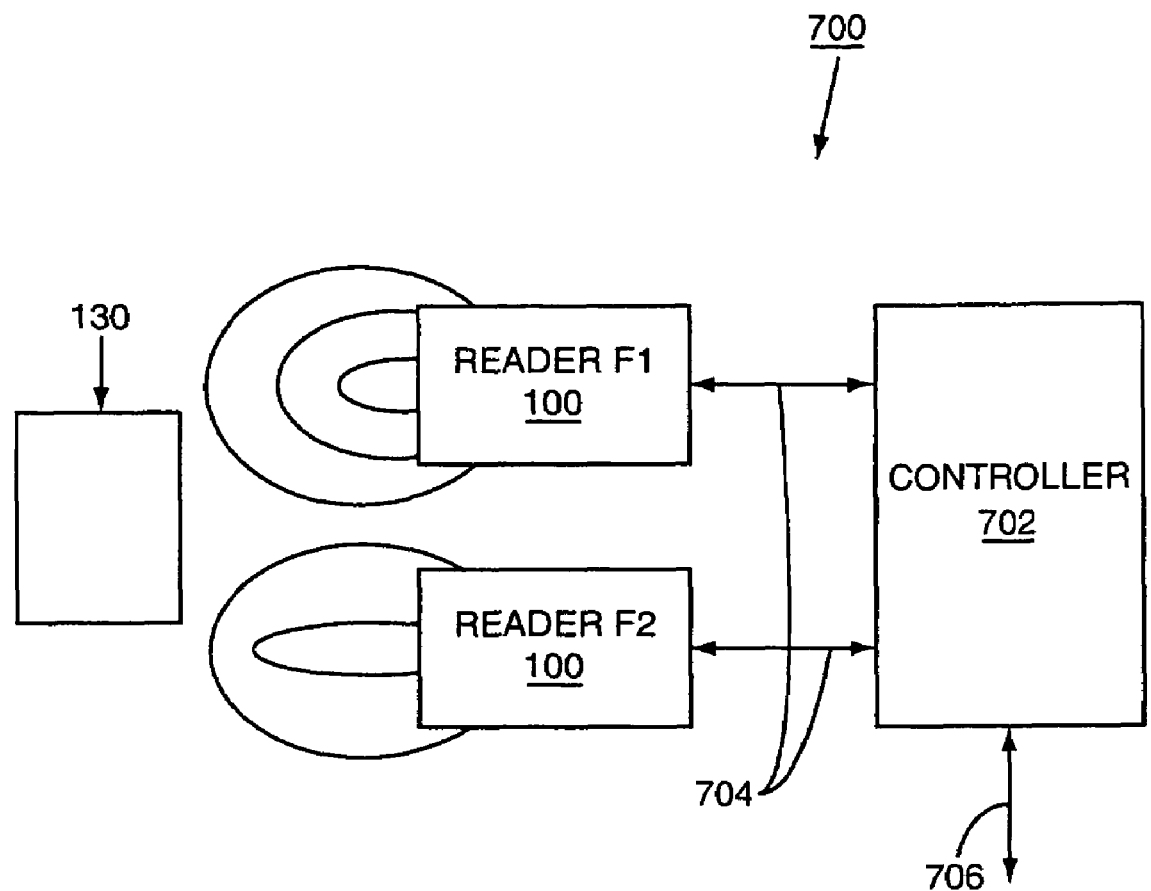
FIG. 13 illustrates a schematic diagram of a synchronization device for dual chip wireless communication devices.

For wireless communication devices 130 that contain two chips 208, 256 coupled to common antennas, there may be a desire to synchronize the data carried in each chip 208, 256, so that when they are interrogated at any of the operational frequencies, the same data is returned. A simple method of achieving this desired result is a dual reader/writer device 700, as illustrated in FIG. 13. Dual reader/writer device 700 comprises a controller 702 controlling two or more interrogation readers 100 by data flow connections 704. Dual reader/writer device 700 may include an optional communicative link 706 to a remote source. Wireless communication device 130 is brought into the communicative fields of the at least two interrogation readers 100 and data exchanged therebetween.

It may be advantageous to have all the data written to memory 138 of the wireless communication device 130 to be time and date stamped. In use, information may be read and written by the interrogation readers 100 operating at only a single frequency, allowing memory 138 on the different chips 208, 256 to be modified in different manners at different times by different readers. This creates different outputs from the different chips 208, 256. Understandably, this situation is undesirable.

Figure 14:
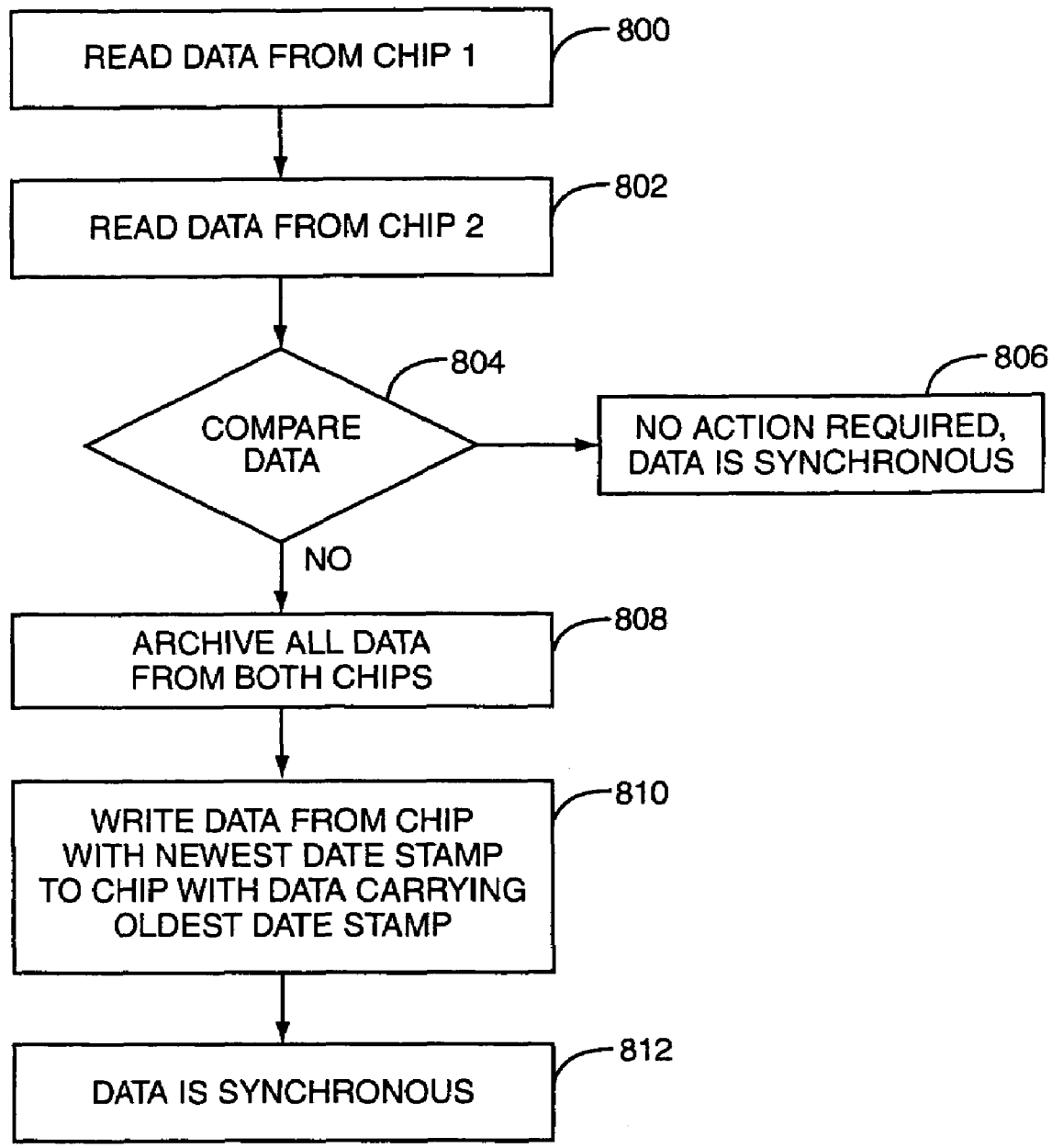
FIG. 14 illustrates a flow chart for the synchronization of data for dual chip wireless communication devices.

The methodology is illustrated as a flow chart in FIG. 14. One of the interrogation readers 100 reads the data from the first chip (for example, chip 208) (block 800). The second interrogation reader 100 reads the data from the second chip (for example, chip 256) (block 802). The controller 702 compares the data returned from the two chips 208, 256 (block 804). If the data is synchronous, no action is required and the process ends (block 806). If however the data is not synchronous, the controller 702 may archive all the data from both chips 208, 256 (block 808). The controller 702 may then instruct the appropriate interrogation reader 100 to write the data from the chip 208, 256 with the newest date stamp to the chip 208, 256 carrying the older date stamp (block 810). The data is now synchronous between the two chips 208, 256 and the process ends (block 812). Other techniques of synchronization are also possible.

Figure 6:
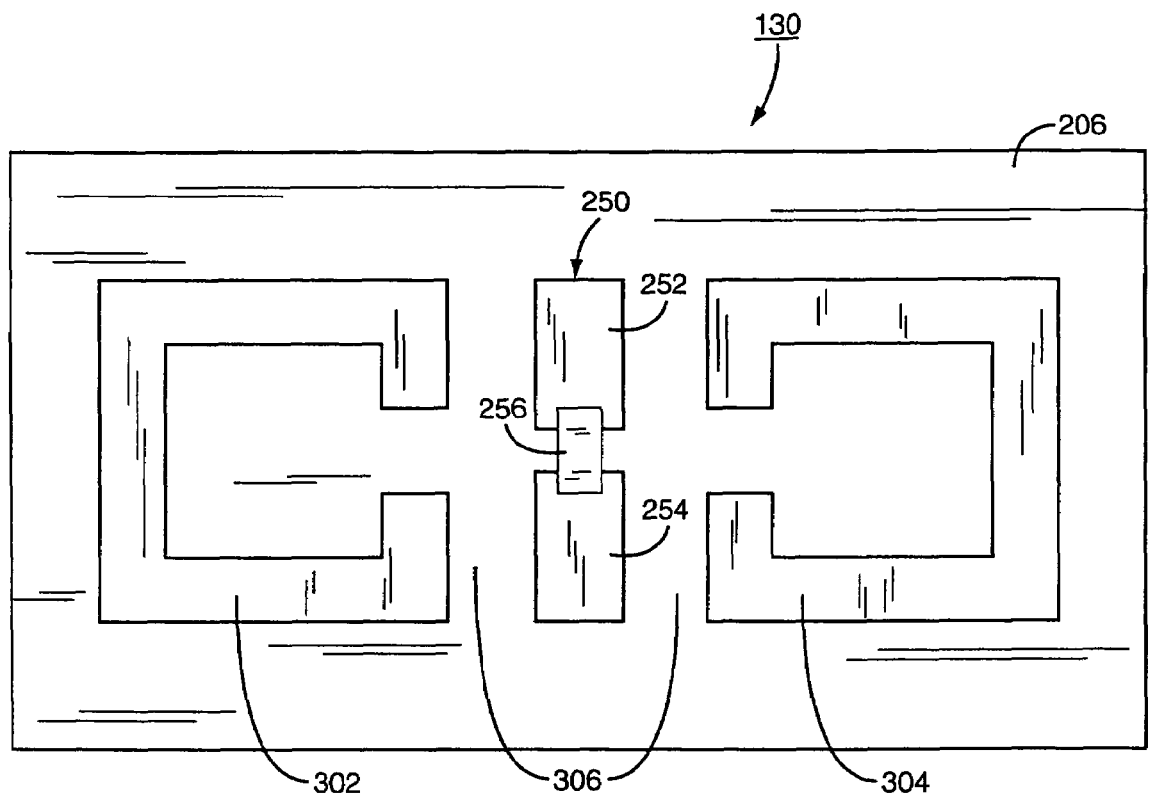
FIG. 6 illustrates a second embodiment of an antenna arrangement for a wireless communication device.

A second embodiment of a multi-band wireless communication device is illustrated in FIG. 6. In particular, the wireless communication device 130 comprises a dipole antenna 250 and a pair of loop conductor antennas 302, 304 oppositely positioned from one another on either side of the dipole antenna 250. Dipole antenna 250 comprises a first tab 252, a second tab 254, and an integrated chip 256 as previously described and may be operative at 2.45 GHz. Loop conductor antennas 302, 304 may comprise multiple coils (not shown) or a single coil of microstrip and may be sized as needed to achieve a desired operating frequency. Note that the gaps 306 between the tabs 252, 254 and the loop conductor antennas act as series capacitors, forming resonant circuits between the integrated chip 256 and the two loop conductor antennas 302, 304. In one version of this embodiment, the loop conductor antennas 302, 304 operate at 868 MHz and 915 MHz, respectively. An alternate way to tune the loop conductor antennas 302, 304 is to move the relative placement of the dipole antenna 250. If the dipole antenna 250 were closer to one loop (302 or 304) than the other, there would be an increased coupling capacitance between the dipole 250 and the closer loop (302 or 304), impacting the operating frequency. Likewise, there would be a lower coupling capacitance between the dipole and the farther loop (302 or 304), also impacting the operating frequency of that loop (302 or 304) as well. These antennas 250, 302, 304 may likewise be positioned on a substrate 206. In other versions of the present embodiment, the antennas 250, 302, 304 may be positioned on different sides of the substrate 206. Variations in which side of the substrate 206 on which the antennas are placed, the thickness of the substrate, and the like may also be used to tune the antennas 250, 302, 304 to the desired frequencies. Likewise, variations in the dimensions of the loop, the number of coils, and even the material used may impact the operating frequencies of the loops.

Also note that one tab 252, 254 may be used with this embodiment to create a monopole-type antenna if a ground plane (not shown) is provided that is coupled to transponder 130. Likewise, only one loop conductor antenna 302, 304 may be used to create a device that operates at two different frequencies; one through the pole-type antenna and the other through the loop conductor antenna 302, 304.

Figure 7:
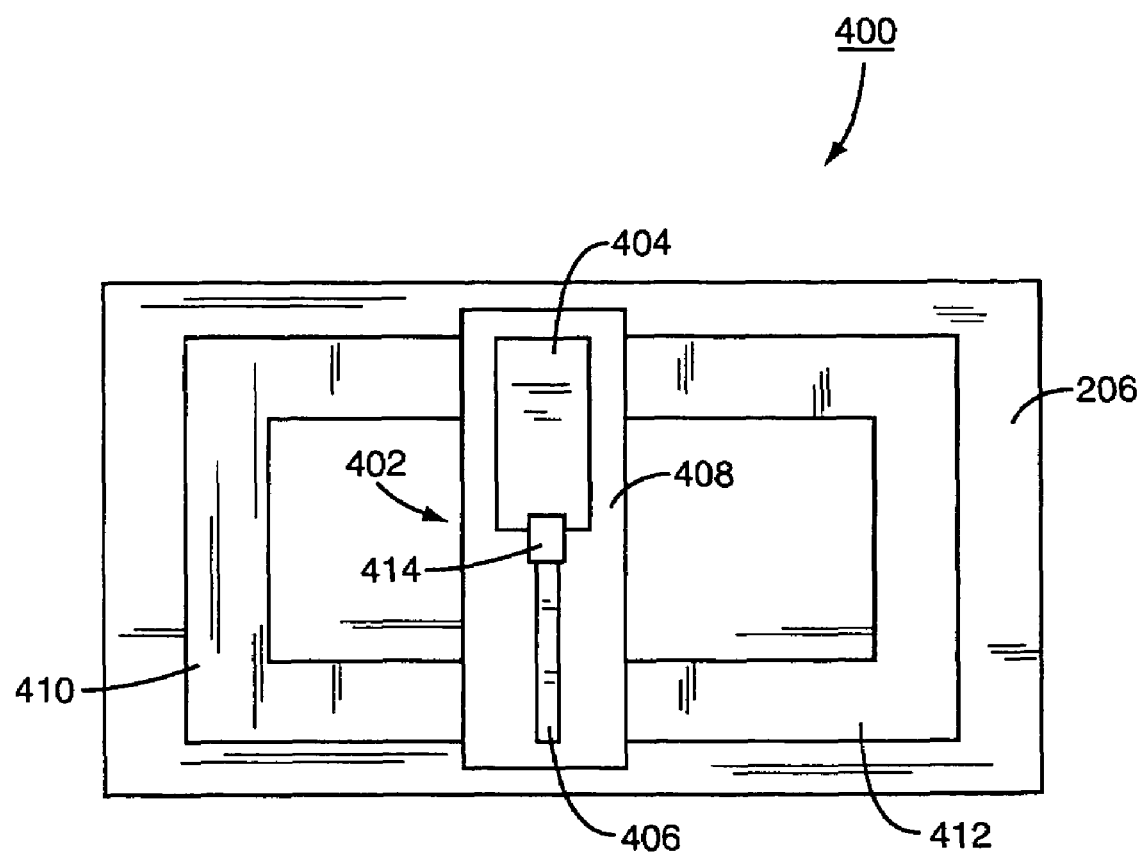
FIG. 7 illustrates a first variation of the second embodiment of FIG. 6.

A number of the variations just discussed, as well as some others are presented in FIGS. 7-11. In FIGS. 7-11, the coils are illustrated as microstrip antennas. Other arrangements are possible. Specifically, FIG. 7 illustrates a transponder 400 comprising an asymmetrical dipole antenna 402 coupled to a pair of asymmetrical loop antennas 410, 412. As illustrated in FIG. 7, the dipole antenna 402 is positioned such that loop antenna 410 is smaller than loop antenna 412. Dipole antenna 402 comprises asymmetrical tabs 404, 406 as illustrated. Variations in the nature of the asymmetry to achieve the desired operating frequencies are considered within the skill of those in the industry. A further discussion of asymmetrical dipole antennas may be found in commonly owned, concurrently filed U.S. patent application Ser. No. 09/678,271, entitled WIRELESS COMMUNICATION DEVICE AND METHOD, which is hereby incorporated by reference in its entirety. A ground plane 408 is further used to tune the antennas 402, 410, 412. Chip 414 controls all the antennas 402, 410, 412. Further tuning may be achieved by varying the position of the various elements on the substrate 206. For example, some elements may be on one side, some embedded, and some on the other side; all the elements may be embedded; all the elements on one side; or other arrangement as needed or desired. It should be appreciated that the ground plane 408 may be isolated from the other elements to provide the desired grounding effect, but such may be done with a dielectric tape or the like as is well understood. Again, this wireless communication device 400 has multi-frequency functionality in that the dipole antenna 402 may operate at a first frequency, the first loop antenna 410 may operate at a second frequency, and the second loop antenna 412 may operate at a third frequency.

Figure 8:
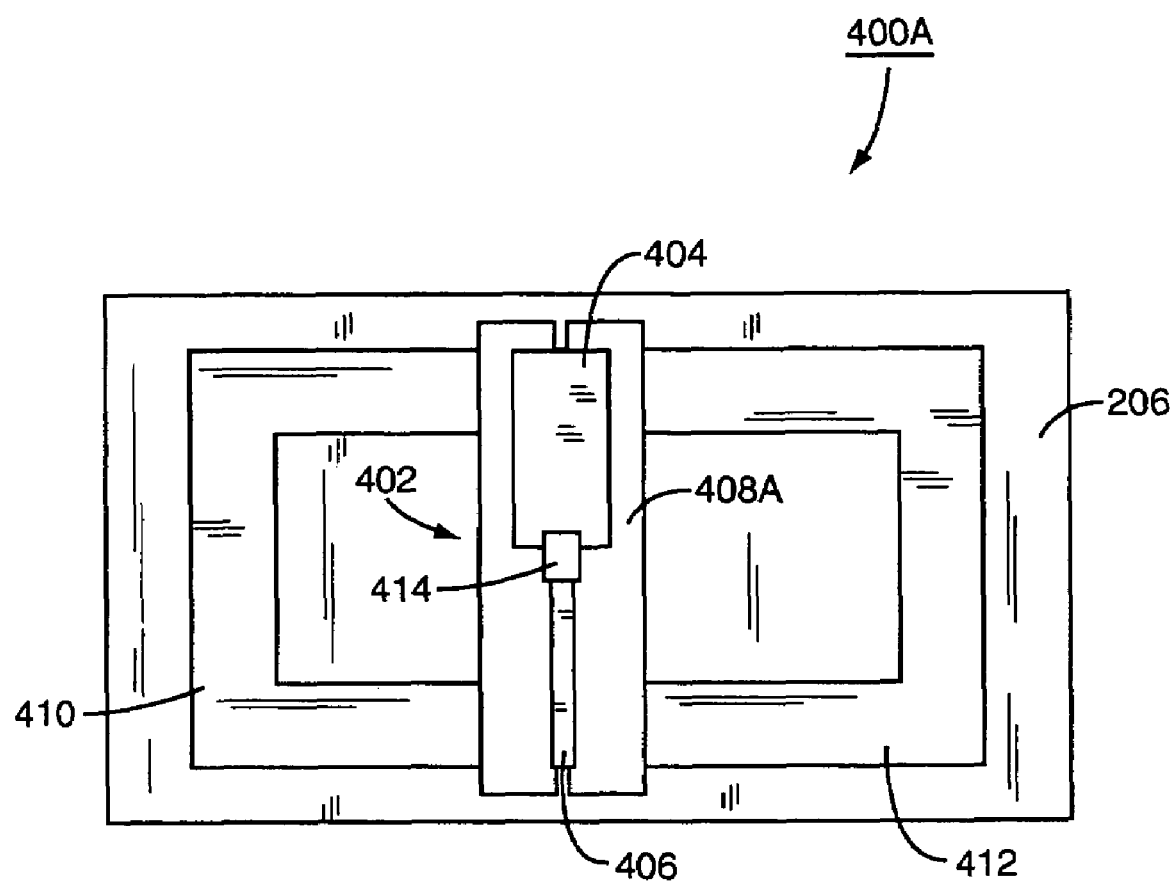
FIG. 8 illustrates a second variation of the second embodiment of FIG. 6.

FIG. 8 illustrates a second variant wireless communication device 400A, wherein the ground plane 408A is slotted behind the dipole 402 to minimize interaction between the loop antennas 410, 412. This is a function of the fact that at UHF frequencies, the gap will appear as a high impedance gap. At the microwave frequencies of the dipole 402, the gap has a relatively low impedance and looks like a continuous ground plane, allowing the dipole 402 to operate normally.

Figure 9:
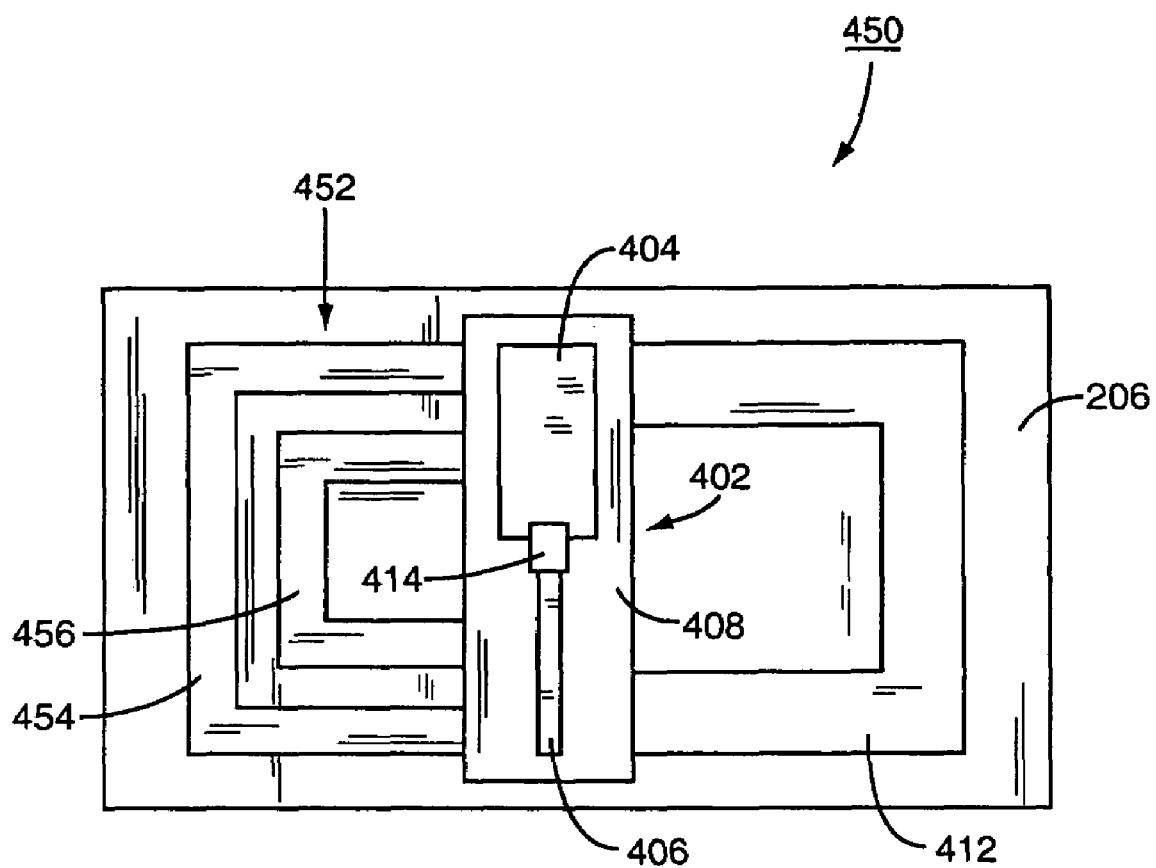
FIG. 9 illustrates a third variation of the second embodiment of FIG. 6.

FIG. 9 illustrates a third variant with nested loops for improved bandwidth response. In particular, wireless communication device 450 comprises an asymmetrical dipole antenna 402, a ground plane 408, a first loop 412, a second loop 452, and a chip 414. Second loop 452 comprises a first part 454 and a second part 456, which are nested and coupled to the dipole 402. If the loops are similarly sized, but not identical, the overall circuit behaves like two coupled tuned circuits, giving an overall wider receive bandwidth than would be achieved with one loop.

Figure 10:
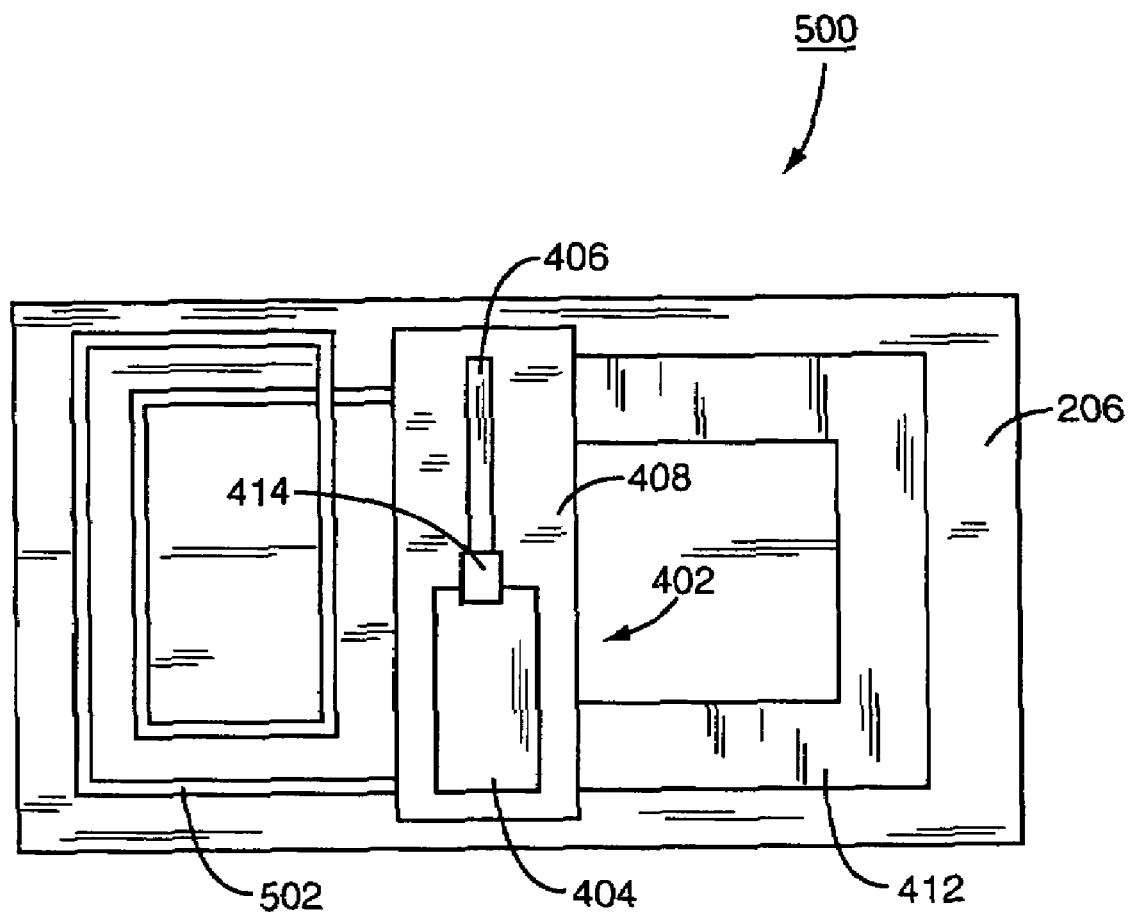
FIG. 10 illustrates a fourth variation of the second embodiment of FIG. 6.

FIG. 10 illustrates a fourth variant wireless communication device 500. Wireless communication device 500 comprises a dipole antenna 402, a ground plane 408, a first loop antenna 412, and a second loop antenna 502. Second loop antenna 502 is electrically longer at low frequencies such as 13.56 MHz. Additionally, it should be noted that the coils of the second loop antenna 502 may be separated by a dielectric tape, or even by having an opposite surface connection.

Figure 11:
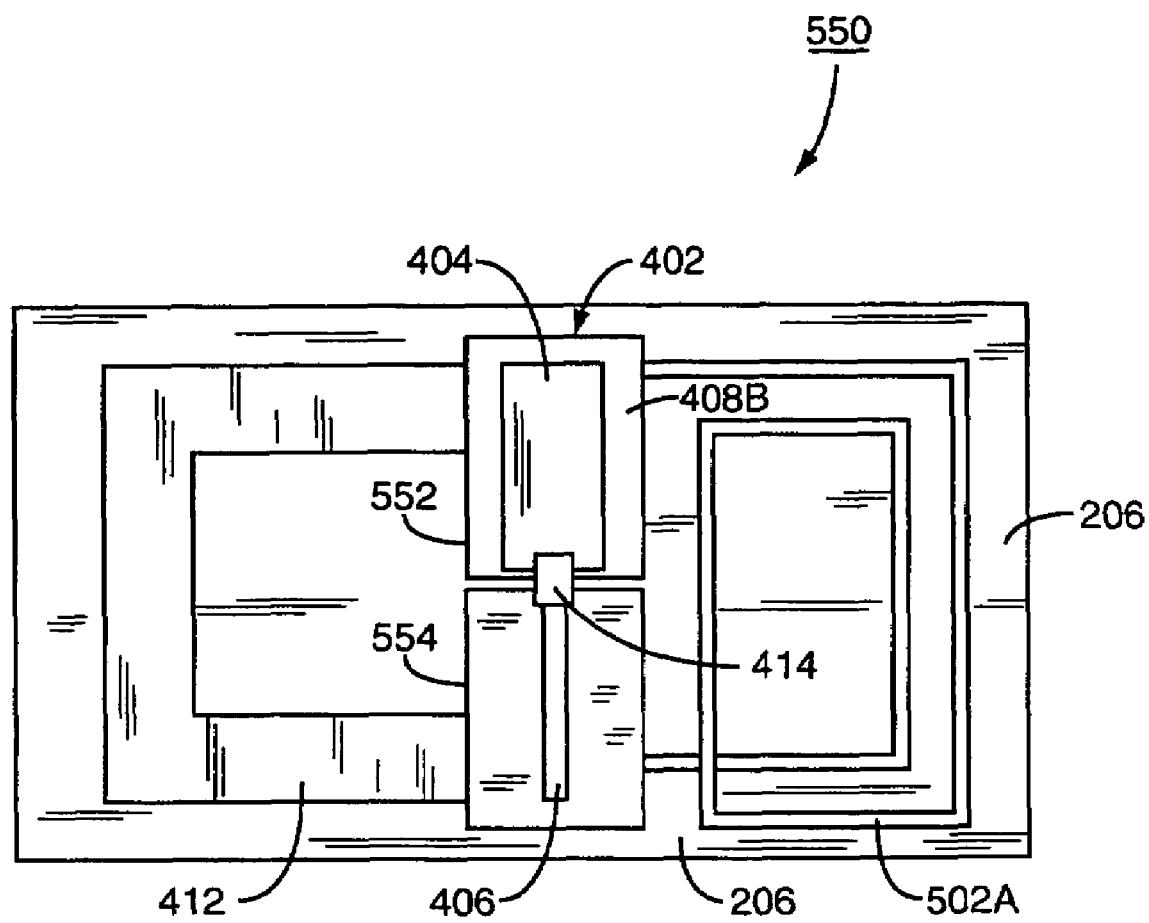
FIG. 11 illustrates a fifth variation of the second embodiment of FIG. 6.

FIG. 11 illustrates a fifth variant wireless communication device 550. Wireless communication device 550 comprises a dipole antenna 402, a slotted ground plane 408B, a first loop antenna 412, and a second loop antenna 502A. The first loop antenna 412 is operative at UHF frequencies, the dipole antenna 402 at microwave frequencies, and the second loop antenna 502A is operative at low frequencies akin to second loop antenna 502. The second loop antenna 502A is coupled to the chip 414 via capacitance between the two plates 552, 554 of the slotted ground plane 408B. In this variant, a thin substrate 206 allows increases in the capacitive coupling between the dipole antenna 402 and the second loop antenna 502A. The narrow gap in the ground plane 408B is seen as a relatively low impedance gap at microwave frequencies, allowing the dipole antenna 402 to function normally.

The variants and embodiments of FIGS. 6-11 are designed more from a fresh perspective than with an eye towards retrofitting. That does not mean that these variations may not be used in a retrofit context, but the presently commercially available wireless communication devices 200 are not designed to accommodate these variations as easily. To that end, the embodiments of FIGS. 6-11 are designed to operate with a single RFID chip, 256 or 414. Chip 256 or 414 can sense in a simple way which frequency at which the interrogation is occurring. If the chip 256, 414 has an input port connected to the antenna terminals prior to the internal rectifier, it will 'see' 13.56 MHz when being interrogated at this frequency, but not when being interrogated at higher frequencies. This is useful because when operating at 13.56 MHz, the standard requires that the chip 256, 414 clock off the received field. This may also be helpful because the chip 256, 414 may change modulation methods, data rates or the like depending on the received frequency. Alternatively, the interrogator 100 may simply send an identifier as part of the interrogation message. The identifier may identify the frequency at which the interrogator 100 is operating. This identifier may be in the form of amplitude modulation of the signal or other technique as desired.

Figure 12:
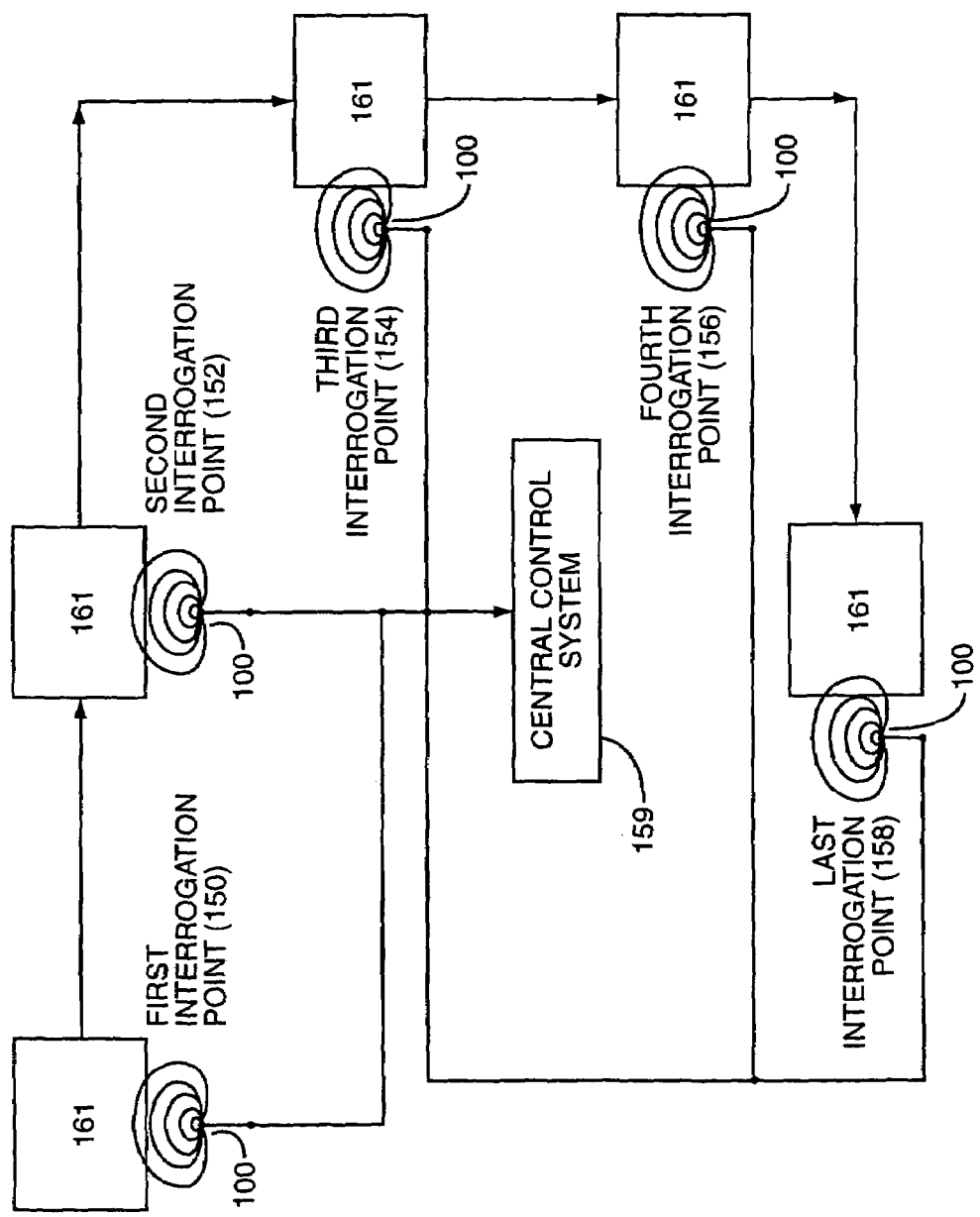
FIG. 12 illustrates a schematic diagram of a tracking and information system.

FIG. 12 illustrates one type of tracking system whereby the transponder 130 attached to articles 161, for example, automobile 160, can be tracked through an environment such as a factory, distribution facility or storage facility. For example, the transponder 130 connected to article 161 passes a first interrogation point 150 that includes an interrogation reader 100. When the article 161 and its attached transponder 130 are in the presence of the interrogation reader 100 as described previously, a message containing information and/or a specific request for information may be transmitted by the interrogation reader 100 and received by the transponder 130. This process continues as the article 161 moves to a second interrogation point 152, a third interrogation point 154, a fourth interrogation point 156, and on to a last interrogation point 158.

A central control system 159 maintains the information from interrogation readers 100 and monitors the movement of the articles 161 through the facility. The information received by each of the interrogation readers 100 may be forwarded to the central control system 159 in a variety of architectures such as parallel or serial communication or through use of a local area network (LAN) or wide area network (WAN). Such architecture may include wiring between the interrogation readers 100 and the central control system 159 or may be wireless communication. The central control system 159 may also send information to the interrogation reader 100 to be transmitted back to the transponder 130 attached to the article 161 for a variety of purposes, including for identification. If the central control system 159 is designed to have knowledge of anticipated or expected whereabouts of the articles 161, then an alarm may be generated if the control system 159 expects to receive information about a particular article 161 and does not. Other situation based alarms may also be possible, such as when an item appears at the same station twice or if some other unexpected situation occurs.

Note that wireless communication devices 130 having their own transmission capability may still be used for tracking and communicating information concerning articles 161 without the use of interrogation readers 100. In its simplest form, a receiver to receive communication from the wireless communication device 130 would be needed. Alternatively, multiple receivers may be used to triangulate the position of the tracked article 161. If the system tracks and/or receives information from more than one wireless communication device 130, the system may need to have the ability to receive and transmit on different frequencies in order to distinguish wireless communication devices 130. However, an identification stored in memory 138 of the transponder 130 may also be used to distinguish wireless communication devices 130. During commissioning of each transponder 130, it may be necessary to place the transponder 130 in range of an interrogation reader 100 to erase previously stored information in memory 138 or to store particular data or configuration information about the article 161 in memory 138 for later use.

It should be appreciated that while the present invention is phrased as being operative at certain frequencies, the intended interpretation of such comments is that some bandwidth centered about the operative frequencies is used. Thus, for example, stating that the dipole antenna 250 may be operative at 2.45 GHz is intended to mean that the dipole antenna 250 operates on a channel having a bandwidth centered at 2.45 GHz. This is true for the other operative frequencies as well.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of testing data output from a wireless identification communication device comprising at least two separate and separately interrogatable chips, wherein each chip is associated with a respective memory, and wherein the wireless identification communication device is configured to communicate the data output in response to an interrogation, the method comprising:

interrogating the wireless identification communication device with a first interrogation reader at a first frequency to query a first memory associated with a first one of the at least two chips and receiving a first data output therefrom;

interrogating the wireless identification communication device with a second interrogation reader at a second frequency to query a second memory associated with a second one of the at least two chips and receiving a second data output therefrom; and comparing the first and second data outputs received from the first and second memories using a controller coupled to the first and the second interrogation readers.

2. The method of claim 1, further comprising synchronizing the first and second data outputs in the associated memories of the at least two chips.

3. The method of claim 2, wherein said synchronizing comprises sending an instruction to one of the at least two chips to update information stored in the memory associated therewith.

4. The method of claim 3, further comprising archiving both of the first and second data outputs prior to synchronizing the first and second data outputs.

5. The method of claim 4, further comprising comparing date stamps respectively associated with each of the first and second data outputs.

6. The method of claim 5, wherein said sending an instruction comprises sending the data output having a later date stamp to the chip whose data output is associated with an earlier date stamp.

7. The method of claim 1, further comprising archiving both of the first and second data outputs if the outputs are not synchronous.

8. The method of claim 1, further comprising sending an instruction to one of the at least two chips to update information stored in the memory associated therewith.

9. The method of claim 8, wherein said sending an instruction comprises sending the data output having a later date stamp associated therewith to the chip whose data output is associated with an earlier date stamp.

10. A method of testing data output from a wireless identification communication device comprising at least two separate sets of separately interrogatable wireless communication electronics, wherein the wireless identification communication device is configured to communicate the data output in response to an interrogation, and wherein each set of wireless communication electronics is associated with a respective memory, the method comprising:

using a first interrogation reader of a dual reader/writer communication device to interrogate the wireless identification communication device at a first frequency to query a first memory associated with a first one of the at least two sets of wireless communication electronics and to receive a first data output therefrom;

using a second interrogation reader of the dual reader/writer communication device to interrogate the wireless identification communication device at a second frequency to query a second memory associated with a second one of the at least two sets of wireless communication electronics and to receive a second data output therefrom; and using a controller of the dual reader/writer communication device to compare the first and second data outputs received from the first and second memories.

11. The method of claim 10, further comprising synchronizing the first and second data outputs in the associated memories of the at least two sets of wireless communication electronics.

12. The method of claim 11, wherein said synchronizing comprises sending an instruction to one of the at least two sets of wireless communication electronics to update information stored in the respective memory associated therewith.

13. The method of claim 12, further comprising archiving both of the first and second data outputs prior to synchronizing the first and second data outputs.

14. The method of claim 13, further comprising comparing date stamps respectively associated with each of the first and second data outputs.

15. The method of claim 14, wherein said sending an instruction comprises sending the data output having a later date stamp to the one of the at least two sets of wireless communication electronics whose data output is associated with an earlier date stamp.

16. The method of claim 10, further comprising archiving both of the first and second data outputs if the outputs are not synchronous.

17. The method of claim 10, further comprising sending an instruction to one of the at least two sets of wireless communication electronics to update information stored in the memory associated therewith.

18. The method of claim 17, wherein said sending an instruction comprises sending the data output having a later date stamp to the one of the at least two sets of wireless communication electronics whose data output is associated with an earlier date stamp.

19. An apparatus for testing data output from a wireless identification communication device comprising at least two separate sets of separately interrogatable wireless communication electronics, wherein the wireless identification communication device is configured to communicate the data output in response to an interrogation, and wherein each set of wireless communication electronics is associated with a respective memory, the apparatus comprising:

a first means for interrogating the wireless identification communication device at a first frequency to query a first memory associated with a first one of the at least two sets of wireless communication electronics and for receiving a first data output therefrom;

a second means for interrogating the wireless identification communication device at a second frequency to query a second memory associated with a second one of the at least two sets of wireless communication electronics and for receiving a second data output therefrom; and means for controlling the first and second means and for comparing the first and second data outputs received from the first and second memories.

20. The apparatus of claim 19, further comprising means for synchronizing the first and second data outputs in the associated memories of the at least two sets of wireless communication electronics.

21. The apparatus of claim 20, wherein the means for synchronizing comprises means for sending an instruction to one of the at least two sets of wireless communication electronics to update information stored in the respective memory associated therewith.

22. The apparatus of claim 21, further comprising means for archiving both of the first and second data outputs prior to synchronizing the first and second data outputs.

23. The apparatus of claim 22, further comprising means for comparing date stamps respectively associated with each of the first and second data outputs.

24. The apparatus of claim 23, wherein the means for sending an instruction comprises means for sending the data output having a later date stamp to the one of the at least two sets of wireless communication electronics whose data output is associated with an earlier date stamp.

25. The apparatus of claim 19, further comprising means for archiving both of the first and second data outputs if the outputs are not synchronous.

26. The apparatus of claim 19, further comprising means for sending an instruction to one of the at least two sets of wireless communication electronics to update information stored in the memory associated therewith.

27. The apparatus of claim 26, wherein the means for sending an instruction comprises means for sending the data output having a later date stamp to the one of the at least two sets of wireless communication electronics whose output is associated with an earlier date stamp.

* * * * *